April 10, 1962    L. REIFFEL ETAL    3,029,343
NEUTRON SPECTROMETER
Filed July 23, 1959
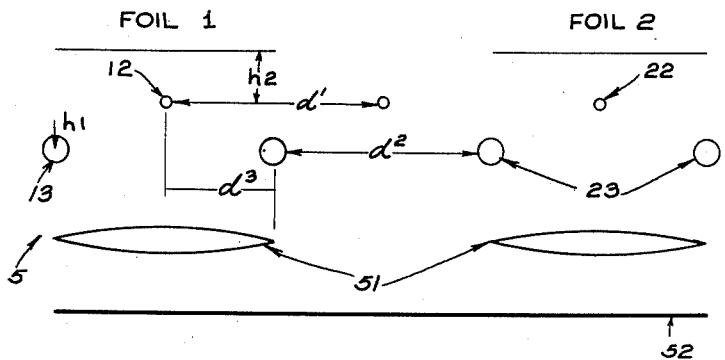
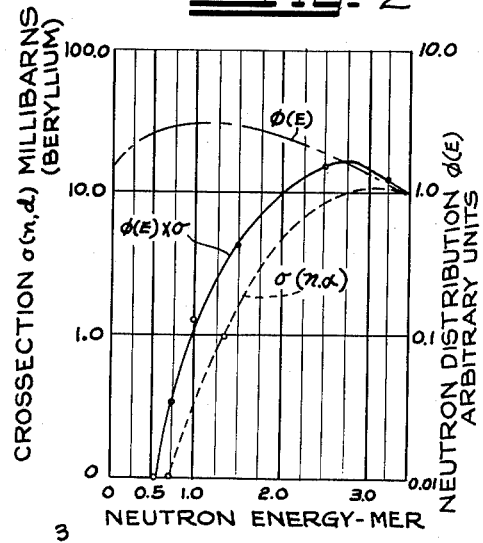
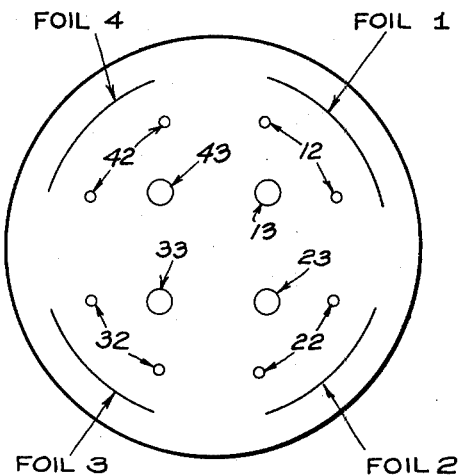
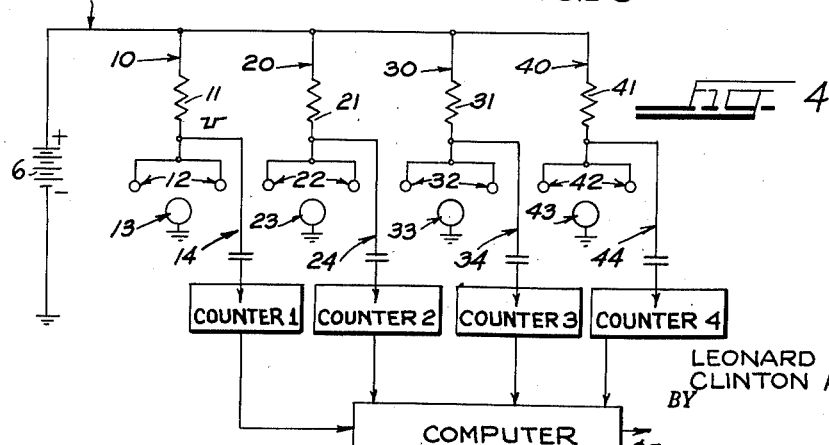
INVENTORS:
LEONARD REIFFEL
CLINTON A. STONE
BY

United States Patent Office 3,029,343
Patented Apr. 10, 1962

3,029,343
NEUTRON SPECTROMETER
Leonard Reiffel, Chicago, and Clinton A. Stone, South Holland, Ill., assignors to Armour Research Foundation of Illinois Institute of Technology, Chicago, Ill., a corporation of Illinois
Filed July 23, 1959, Ser. No. 829,070
13 Claims. (Cl. 250—83.1)

This invention relates to a novel method and apparatus for determining the energy distribution of neutrons, and more particularly to such method and apparatus whereby neutron detection is accomplished and the energy distribution of the neutrons field being investigated is determined by the apparatus hereinafter described.

As is well known to those skilled in this particular art, an efficient as well as relatively non-complex neutron spectrometer is still a very urgent scientific practical need. Specifically, there are presently two known methods whereby neutron spectrometry is accomplished.

One such method involves the use of spaced discs with holes therethrough, rotated in synchronism whereby the energy level of neutrons which pass through both discs can be determined as the function of the differential speed between the discs and the spacing therebetween. The apparatus performing this method must of necessity include moving parts and accurate speed control.

The other method consists of inserting materials, which exhibit thresholds for (n, alpha) reactions at different energy levels, into a reactor for a number of hours and subsequently measuring the radio-activity of the foil whereby the neutrol energy level is determined. A plurality of foils can be in the reactor in a given period, however, each foil has to be counted individually and you have to correct for the time in the reactor as well as the time between irradiation and counting. Consequently, depending upon the number of foils used this complicated method would inter alia involve a considerable amount of time.

The instant invention obviates the above mentioned difficulties of the heretofore known methods of neutron spectrometry by providing a novel time saving method as well as apparatus of relatively simple design.

It is accordingly, a primary object of the instant invention to provide a method and related apparatus whereby the energy distribution of neutrons and especially slow neutrons may be determined and recorded.

Another object of the instant invention is to provide a method of neutron spectrometry and apparatus therefor in which energized spark counters are actuated by impinging neutrons of discrete energy levels and the effects of such neutrons are in turn recorded.

A further object of the instant invention is to provide apparatus for determining neutron energy distribution in which an array of wires suspended above a plurality of plates, or the like, form the basic structural components thereof.

Still another, more specific object, of the instant invention is to provide a method for determining neutron energy distribution wherein; radiation is directed onto ionizing radiation producing elements having different thresholds for (n, alpha) reactions, and the radiation thus produced is directed into an electric field whereby sparks are formed, and recording such sparks.

For a better understanding of the present invention, together with other and further objects therein, reference is had to the following description, taken in connection with the accompanying drawings and its scope will be pointed out in the appended claims.

In the drawings:

FIGURE 1 is a side view of the basic structural components of a preferred form of the neutron spectrometer in accordance with the present invention and photographic recording apparatus for use therewith;

FIGURE 2 is a graph, for use in describing the operation of the system in FIGURE 1;

FIGURE 3 represents another preferred arrangement of the spectrometer system in accordance with the invention for use with an electrical readout system;

FIGURE 4 is a schematic diagram of an electrical readout system arranged to operate in accordance with the invention.

The sparking devices used herein are shown and described in co-pending application Serial No. 818,966, filed June 8, 1959, entitled "Method for Radiation Detection and Apparatus Therefor," and assigned to the present assignee, The Armour Research Foundation of the Illinois Institute of Technology.

Briefly, the sparking devices disclosed therein are responsive to ionizing radiation as a result of an (n, alpha) or other reaction occasioned by impinging neutrons. Such ionizing radiation consisting of protons, alpha particles or various other heavier atomic fragments is passed into an intense electric field, in a suitable atmosphere causing the breakdown of the field resulting in sparks in substantially the area of neutron impingement. All of the herein presented embodiments of our invention make use of such phenomena, and for a more detained disclosure thereof reference is had to the above mentioned co-pending application.

Referring next to the drawings in which like numbers denote like parts:

The neutron spectrometer is generally indicated by the numeral 5 in the drawings. The chamber in which the spectrometer would be contained is not shown in that it is unnecessary for clearness of understanding of the principles herein involved. However, it is noted that such chamber must be gas-tight with an electrical outlet to facilitate electrical connections to the spectrometer. The chamber may also contain gas ports whereby flushing of a suitable atmosphere is possible. Where optical recording is desired, the chamber may be conveniently made of a clear material. On the other hand, an opaque material may be used in part so long as a transparent window is provided in the spark presentation area.

FIGURE 1 depicts a preferred embodiment of our invention in which only two reaction foils are shown, it being noted that a greater number of such foils may be employed without departing from the novel concepts disclosed herein. Threshold reaction foil 1 is placed in close spaced relation to spark counter 12—13. In such counter the anodes are fine wires 12 and the cathode is a relatively larger diameter wire 13. Cathode wire 13 lies in a plane separated from anode wires 12 and is so displaced relative thereto that it lies substantially at the midpoint between the anode wires. The threshold reaction foil exhibits a discrete threshold value; that is, when the foil is impinged by neutrons of energy levels below said value an (n, alpha) reaction would not occur. However, when the foil 1 is impinged by neutrons above its threshold a reaction occurs and consequently, ionizing radiation is directed into an electric field existing between anode wires 12 and cathode wire 13 whereby a spark discharge occurs. Foil 2, on the other hand, exhibits a higher threshold value in the energy range on interest, therefore, a spark discharge cannot occur between anode wires 22 and cathode wires 23 unless a neutron of sufficiently high energy impinges foil 2.

In one particular construction of this embodiment the anode wires were 0.0042 in. in diameter and the cathode wires had 0.0482 in. in diameters. The foils were vertically displaced 0.040 in. ($h_2$ in FIG. 1) from the anodes and the cathodes were vertically displaced on the opposite side thereof 0.040 in. ($h_1$ in FIG. 1) from the anodes. The anodes were spaced apart 0.090 in. ($d_1$ in FIG. 1) as were the cathodes ($d_2$ in FIG. 2). However, the anodes are displaced 0.045 in. ($d_3$ in FIG. 1) with respect to the cathodes such that vertical projections through their centers bisect the spacings between the cathodes.

The discharges can be recorded electrically and/or optically. If a photographic record were utilized the discharge would then be recorded on the photographic plate 52. Photographic plate 52 would be placed in a predetermined spaced relation with respect to the spectrometer, consequently, the subsequent development thereof would disclose a density distribution corresponding to known neutron energy thresholds.

In some instances it may be desirable to discriminate against the blue nitrogen corona in favor of the red lines of the sparks. In such instances filters 51 may be interposed between the spectrometer and the plate 52. The spatial arrangement of the filters 51 are simply such that the plate 52 records the sparks in a reasonably undistorted manner.

If electrical recordings were used, the sparking devices positioned near each foil would be connected in groups to separate channels of a pulse recording system. In this manner it is known which foil emits the ionizing radiation causing the discharge. Very large signals are available therefore pulse amplification is unnecessary. Most frequently electric recording will be used in which case, the limitations to the transparency of the spectrometer chamber may be disregarded.

Considering now the theory of operation of the system and referring for explanation to the curves shown in FIGURE 2, the response curve of a material exhibiting a discrete threshold in a finite energy range is shown. By threshold hereinbelow and in the appended claims is meant that value of neutron energy below which an (n, alpha) reaction would not occur.

More particularly the curves (plotted on a semi-logarithmic scale) represent for a beryllium foil: the response function of the foil $\sigma(n, a)$; the function proportional to the counting rate which is the quantity obtained from the spectrometer $\phi(E) \times \sigma$; and of the neutron distribution $\phi(E)$. The count rate $N_i$ proportional to $\phi(E) \times \sigma$ is the data directly obtainable from the spectrometer. As shown in FIGURE 2 there would not be any counting data for impinging neutrons of energy levels below 0.54 million-electron-volt. As a result thereof any data obtained is known to have been caused by neutrons of energies greater than 0.54 mev. If a sulfur foil were also used in the spectrometer, the counting data therefrom would indicate that neutrons of energies of at least 0.9 mev. are impinging the sulfur foil. In this manner, a neutron field can be examined in a finite energy range, with a number of foils exhibiting successively increasing thresholds.

The following table is a partial list of materials having different thresholds.

*Table 1*

| Resolution | Threshold (Million electron volts) | Cross section (millibarns) |
|---|---|---|
| $Be^9(n,a)He^6$ | 0.3 | 10 |
| $S^{34}(n,a)Si^{31}$ | 0.9 | 3.0 |
| $F^{19}(n,a)N^{16}$ | 1.5 | 4.5 |
| $P^{31}(n,a)Al^{28}$ | 2.0 | 1.43 |
| $V^{51}(n,a)Sc^{48}$ | 2.4 | .08 |
| $Al^{27}(n,a)Na^{24}$ | 3.3 | 0.6 |
| $Na^{23}(n,a)F^{20}$ | 4.0 | 0.4 |
| $B^{11}(n,a)Li^8$ | 7.2 | .085 |

From such table the proper materials may be selected to cover an energy range of interest.

As an illustration, reference is had to the following chart wherein 4 foils ($Be^9$, $S^{34}$, $F^{19}$, $P^{31}$) are employed in the spectrometer in accordance with the principles of our invention to exhibit the utility thereof:

| | Foils in the Spectrometer | | | | Energy Range (Mev.) |
|---|---|---|---|---|---|
| | | | | | |
| (A) | $Be^9$ | $S^{34}$ | $F^{19}$ | $P^{31}$ | |
| (B) | SR | NR | NR | NR | 0.0–0.5 |
| (C) | FR | SR | NR | NR | 0.5–1.0 |
| (D) | FR | FR | SR | NR | 1.0–1.5 |
| (E) | FR | FR | FR | SR | 1.5–2.0 |
| (F) | FR | FR | FR | FR | 2.0 and greater. | where SR is some response, NR is no response, and FR is full response. In this illustration, the count rate for $Be^9$ in (B) would give an accurate indication of the density of neutrons in the 0.3–0.5 mev. range. On the other hand, the count rate from $F^{19}$ in (D) would indicate the relative proportion of neutrons at the 1.5 mev. energy level. In other words, the fluorine ($F^{19}$) foil is only responsive to neutrons of energies equal to or greater than 1.5 mev. consequently, any data obtained in (C) from the counter associated with the $F^{19}$ foil would be a result of impinging neutrons of energies equal to or greater than 1.5 mev. From the foregoing it can be seen that an accurate representation of a neutron spectrum is obtained.

Our experiments have shown that spark counters may be employed as high efficiency alpha detectors with very low gamma, beta response. Also, the data recorded have shown no effect due to a gamma field of $10^6$ roentgens per hour. This is due to the streamer formation mode of operation of the spark counters employed. Thus, a series of counts can be obtained from each of the counters or sections of the counters corresponding to a thin foil material. Furthermore (n, alpha) cross sections as low as $10^{-29}$ per cm. squared ($10^{-29}/cm.^2$) at a flux of $10^8$ neutrons per centimeter squared second ($10^8$ neutrons/cm.$^2$ sec.) give usable count rates. It only remains, therefore, that such counting data be transformed to information disclosing energy distribution of the neutron spectrum under investigation.

The mathematics associated with such transformation involves the general process of inversion as outlined hereinbelow:

$$N_i = R \int_{E_i}^{E_{max}} \sigma_i(E)\phi(E) dE \quad (1)$$

where $N_i$ is the counting rate from the $i$th foil, R is the normalizing factor, $\sigma_i$ is the cross section and $\phi$ is the neutron spectrum. Assume the existence of a complete, finite, ortho-normal set of functions, $\mu_n$. Then $\sigma_i$ and $\phi$ may be expanded as follows:

$$\sigma_i(E) = \sum_{K=1}^{M} a_{ik}\mu_k \quad (2)$$

$$\phi(E) = \sum_{e=1}^{m} b_e\mu_e \quad (3)$$

where Equation 2 defines the response function of the foil and Equation 3 is a summation of the neutrons present. An orthonormal set by definition means:

$$\int_a^b \mu_m \mu_n dI \equiv \delta_{mn} \begin{cases} = 1 \quad m=n \\ = 0 \quad m \neq n \end{cases} \quad (4)$$

By substituting Equations 2 and 3 into 1 for functions defined over the interval of energies $E_i$ to $E_{max}$ we obtain:

$$N_i = R \int_{E_i}^{E_{max}} \left(\sum_{k=1}^{m} a_{ik}\mu_k\right)\left(\sum_{e=1}^{n} b_e\mu_e\right) dE \quad (5)$$

where $a_{ik}$ and $b_e$ are constants, thus:

$$N_i = R \int_{E_i}^{E_{max}} \sum_{k,e=1}^{n} a_{ik}b_e(\mu_k\mu_e) dE \quad (6)$$

however, the integral of the sum in a finite set is equal to the sum of the integral, consequently:

$$N_i = R \sum_{k,e=1}^{n} a_{ik} b_e \int_{E_i}^{E_{max}} \mu_k \mu_e dE \quad (7)$$

Applying the identity of Equation 4 it can be shown that:

$$N_i = R \sum_{k,e=1}^{n} a_{ik} b_e \delta_{ke} \begin{cases} = R \sum_{k,e=1}^{m} a_{ik} b_e cfk = e \\ = 0 \; cfk \neq e \end{cases} \quad (8)$$

where the count rate $N_i$ is known as well as the response function $\sigma_i$. Thus, by the proper mathematical manipulations the term $b_e \mu_e$ can be computed. After such computation Equation 3 can be solved, hence the neutron spectrum is determined. The aforesaid manipulation can be performed by a suitably programmed computer.

The practicality and accuracy of this method is determined by the functional form of the cross section $\sigma_i$. An examination of these cross sections shows that they can be approximated to the necessary degree by a series of orthonormal functions and therefore, the transformations can be uniquely and easily performed with the aid of a computer. Furthermore, once these specific materials have been selected the representation of the cross sections as an orthonormal series can be made once and for all requiring a minimum amount of calculation to determine the neutron spectrum from the counting rate data.

Considering now another preferred embodiment of our invention wherein a direct electrical readout system is used, reference is had to FIGURE 3. The spectrometer 5 comprises; a gas type chamber defined by the shell 7, foils 1 to 4, and their associated spark counters. The shell 7 may be constructed of any structurally sound material which does not absorb neutrons, as for example, thin aluminum or steel. The foils 1 to 4 are selected to represent finite energy ranges within the range of interest. Such materials can be selected from Table I. Neutrons of energy levels to which foil 1 is responsive, upon impingement, would cause emission of ionizing radiation into an electric field existing between the anodes 12 and the cathode 13, whereby, a spark discharge would occur. Foil 2, on the other hand, is selected such that its threshold is at a higher energy than foil 1. Foils 3 and 4 in turn would also exhibit successively higher thresholds. By proper selection of foil materials a fairly accurate energy distribution of the neutron spectrum under investigation may be determined.

Considering now the associated circuitry necessary for direct electrical readout with the aforedescribed embodiments of our invention, reference is had to FIGURE 4. A high voltage source 6 maintains a positive potential of from 1,000 to 10,000 volts difference between the relatively smaller diameter anode wires 12, 22, 32 and 42 and their respective cathodes 13, 23, 33 and 42. One channel corresponding to one foil will be hereinafter described, it being understood that the remaining channels operate in the same manner. The positive terminal of high voltage source 6 is connected through wire 3, lead 10, resistor 11 to anodes 12. The negative terminal of the source is connected through ground to the cathode 13 thereby establishing an intense electric field between the anodes 12 and cathode 13. Whenever ionizing radiation enters the electric field the discharge caused thereby results in a voltage drop common to lead 14 which is coupled through condenser 15 to counter 1. The voltage drop, as hereinbefore noted, is of such magnitude that amplification thereof is not required. The voltage variations, in pulse form, are recorded as count rates. The recorded count rates and the known response functions, in accordance with their predetermined mathematical relationship are then used to calculate the neutron spectrum.

The number of foils used in the above-described embodiments are for purposes of illustration and not intended to limit the invention. Any number of foils may be employed, however, the number used will, of course, define a limit of resolution. For example, for 10 foils one might achieve 25% resolution over most of the interval between ½ and 10 million electron volts.

Preferred embodiments of the invention have been described, but many variations will be apparent to those skilled in the art without departing from the novel concepts embodied herein.

We claim as our invention:

1. A neutron spectrometer comprising in combination; a chamber permitting unobstructed neutron passage therein, an array of anode wires in said chamber, an array of cathode wires in said chamber, means for establishing an electric field across said anode and cathode wires, means situated within the chamber having a distinct neutron energy threshold for emitting ionizing radiation when impinged by neutrons of energies greater than its threshold into said electric field causing spark discharges to occur substantially at the point of neutron impingement, and means to record such discharges.

2. A neutron spectrometer comprising in combination; a gas tight chamber permitting unobstructed neutron passage therein; means within said chamber having an electric field therebetween, a plurality of foils having respectively different reaction thresholds within said chamber which emit ionizing radiation into said electric field when impinged by neutrons of energies greater than or equal to their threshold values, and means to record spark discharges caused by said ionizing radiation entering said electric field.

3. In the spectrometer of claim 1 wherein said last mentioned means is electrical.

4. In the spectrometer of claim 1 wherein said last mentioned means is optical.

5. In the spectrometer of claim 2 wherein said last mentioned means is electrical.

6. In the spectrometer of claim 2 wherein said last mentioned means is optical.

7. In a neutron spectrometer comprising; an air tight chamber permitting unobstructed neutron passage therein, means within said chamber having an intense electric field therebetween, a plurality of foils having successively higher neutron reaction energy thresholds which emit ionizing radiation into the electric field when impinged by neutrons at substantially the points of neutron impingement, and means to record the spark discharges occasioned thereby.

8. A neutron spectrometer comprising; a chamber permitting unobstructed neutron passage therein, cathode means within said chamber, anode means within said chamber, means for establishing an intense electric field between said anode and cathode means, a plurality of means having different neutron energy reaction thresholds which emit ionizing radiation when impinged by neutrons of predetermined energies into the electric field whereby spark discharges occur at substantially the point of neutron impingment between said anode and cathode means, electric means to record the discharges, and photographic means to record the discharges.

9. A neutron spectrometer comprising; a chamber permitting unobstructed neutron passage therein, cathode means within said chamber, anode means within said chamber, means for establishing an intense electric field between said anode and cathode means, a plurality of foils having successively higher neutron reaction thresholds which emit ionizing radiation when impinged by neutrons of energies respectively equal to or greater than the thresholds of the foils into the electric field whereby spark discharges occur at substantially the point of neutron impingement between the anode and cathode means, and means to record the discharges.

10. In the spectrometer of claim 4 wherein corona filtering means are interposed between the spark sources and the record means.

11. In the spectrometer of claim 8 wherein corona filtering means are interposed between the spark discharges and the photographic means.

12. A neutron spectrometer comprising; a chamber permitting unobstructed neutron passage therein, cathode means within said chamber, anode means within said chamber, means for establishing an intense electric field between said anode and cathode means, a plurality of foils having successively higher neutron reaction threasholds which emit ionizing radiation when impinged by neutrons of energies respectively equal to or greater than the thresholds of the foils into the electric field whereby spark discharges occur between the anode and cathode means, counting means connected to said anode and cathode means whereby the spark discharges occurring therebetween are recorded as count rates.

13. A neutron spectrometer comprising; a gas tight chamber permitting unobstructed neutron passage therein, a plurality of anodes within the chamber, a plurality of cathodes within the chamber, means for establishing an intense electric field therebetween, a plurality of foils having different reaction thresholds which emit ionizing radiation spaced proximate to said field within the chamber such that each foil has at least one anode and cathode proximate thereto, means individually connected to each of the anode and cathode means proximate to a foil, and electronic counting means connected to each of the last mentioned means.

References Cited in the file of this patent

UNITED STATES PATENTS 2,604,598     Mead et al. _____ July 22, 1952

OTHER REFERENCES

Baker et al. of Purdue University, AEC Document, LAMS-11, pp. 1-10, declassified Sept. 23, 1948.

Payne et al.: The Rosenblum Spark Counter, Journal of Scientific Instruments, vol. 26, October 1949, pp. 321-324.

Tittle: Slow-Neutron Detection by Foils, Nuclonics, June 1951, pp. 5-8.

Eichholz: The Rosenblum Spark Counter, Nucleonics, October 1952, pp. 46-49.

Swetnick et al.: BF$_3$ Neutron Spark Counter, Neucleonics, June 1957, page 93.

Saha et al.: Operating Characteristics of the Spark Counter, Nucleonics, June 1957, pp. 94 to 97.